(12) United States Patent
Makhdoom (10) Patent No.: US 11,590,830 B2
(45) Date of Patent: Feb. 28, 2023

(54) APPARATUS AND METHOD TO INCREASE SUN VISOR PERFORMANCE

(71) Applicant: Masoodul Hasan Makhdoom, La Grange, GA (US)

(72) Inventor: Masoodul Hasan Makhdoom, La Grange, GA (US)

(\*) Notice: Subject to any disclaimer, the term of this patent is extended or adjusted under 35 U.S.C. 154(b) by 0 days.

(21) Appl. No.: 17/506,408

(22) Filed: Oct. 20, 2021

(65) Prior Publication Data
US 2022/0118827 A1    Apr. 21, 2022

Related U.S. Application Data

(60) Provisional application No. 63/094,017, filed on Oct. 20, 2020.

(51) Int. Cl.
*B60J 3/02* (2006.01)
(52) U.S. Cl.
CPC ................... *B60J 3/0208* (2013.01)
(58) Field of Classification Search
CPC ..................................... B60J 3/0208
USPC ..................... 296/97.2, 97.8, 97.6
See application file for complete search history.

(56) References Cited

U.S. PATENT DOCUMENTS

| | | |
|---|---|---|
| 2,382,875 A | 8/1945 | Handley |
| 3,522,968 A | 8/1970 | Honor |
| 4,090,733 A | 5/1978 | Altschul |
| 4,317,589 A | 3/1982 | Kuss |
| 4,330,148 A | 5/1982 | LaMont |
| 5,015,027 A | 5/1991 | Rifaat |
| 5,484,183 A * | 1/1996 | Rosa ...................... B60J 3/0208 296/97.11 |
| 5,641,191 A | 6/1997 | Jia |
| 5,662,370 A * | 9/1997 | Kassner ................ B60J 3/0208 296/97.8 |
| 6,086,132 A | 7/2000 | Larson |
| 6,224,137 B1 | 5/2001 | Hunker |
| 6,325,442 B1 | 12/2001 | Hunker |
| 6,899,371 B1 | 5/2005 | Hammond |
| 6,981,733 B1 | 1/2006 | Driscoll |
| 7,722,109 B1 | 5/2010 | McGehee |
| 7,891,722 B2 | 2/2011 | Phillips |
| 8,226,149 B2 | 7/2012 | Brule |
| 8,544,933 B1 | 10/2013 | Fuller |
| 9,321,330 B2 * | 4/2016 | Richman ................ B60J 3/0208 |

(Continued)

*Primary Examiner* — Joseph D. Pape
(74) *Attorney, Agent, or Firm* — Richard C. Piercy; Grell & Watson Patent Attorneys LLC (57) ABSTRACT

An apparatus and method to increase vehicle sun visor performance. The apparatus may be manufactured to replace or augment existing vehicle sun visors. The visor has an outer housing and internal void having a bed of leaf springs spread laterally along the visor length. Also within the void is a tongue having a stopper. A slit along the driver-facing lower end allows the stopper to be extended and/or retracted from the visor and also traverse laterally along the visor edge to closely target a solar glare during driving without the need to fully extend the whole visor, thereby minimizing obstruction of a driver's vision. The method may be employed after installing the device. A driver experiencing a solar glare may open the improved visor, extend the tongue and move it in the horizontal direction of the solar glare, then retract the tongue and close the visor when the solar glare subsides.

20 Claims, 6 Drawing Sheets

(56) References Cited

U.S. PATENT DOCUMENTS

2004/0217621 A1 11/2004 McCoy
2012/0133173 A1* 5/2012 Watase ................ B60J 3/0208
296/97.8
2013/0278006 A1 10/2013 Sanchez et al.

* cited by examiner

APPARATUS AND METHOD TO INCREASE SUN VISOR PERFORMANCE

CROSS-REFERENCE TO RELATED APPLICATIONS

To the full extent permitted by law, the present United States Non-Provisional Patent Application hereby claims priority to and the full benefit of, United States Provisional Application entitled "SUN VISOR WITH SUN PATCH," having assigned Ser. No. 63/094,017, filed on Oct. 20, 2020, which is incorporated herein by reference in its entirety.

BACKGROUND OF THE DISCLOSURE

Technical Field of the Disclosure

The instant disclosure relates to vehicles, namely passenger and commercial vehicle interior components. More particularly, the instant disclosure relates to the manufacture and installation of an improved automobile sun visor to better minimize solar interference with vision while without increased visual obstruction.

Description of the Related Art

Improvements in roadway and motor vehicle designs have steadily reduced injury and death rates in all first world countries. Nevertheless, auto collisions are the leading cause of injury-related deaths, an estimated total of 1.2 million in 2004, or 25% of the total from all causes. While many factors contribute to the overall risk that one suffers a motor vehicle accident leading to serious injury or death, one major factor may be interference with driver sensory perception. Drivers usually use at least two senses to inform their driving behavior: vision and hearing. Vision allows a driver to see where they maneuver their vehicle and detect any obstacles that may influence their driving decisions.

During mornings and evenings, when the sun is low in the sky, drivers travelling in the direction of the sun may encounter solar visual interference. Solar visual interference from sun glare essentially causes acute loss of vision or inability to see clearly. It can also cause pain or extended loss of vision. Normally, sun glare requires a driver instinctually to look away or obstruct their view until the sun glare recedes or a driver turns in another direction. This may also encourage drivers to wear protective eyewear (e.g., sunglasses) or utilize standard equipment such as a sun visor to block any solar interference with driver vision. If a driver, or anyone, stares directly into the sun for even short periods, they may suffer serious injury to sensitive anatomical and physiological features of their eyes. When anyone stares directly at the sun—or other types of bright light such as a welding torch—ultraviolet light floods the person's retina, which can burn the exposed tissue of the eye. Short-term damage can include sunburn of the cornea—known as solar keratitis. This injury can occur as a result of mere seconds of this activity. Longer exposure can cause more serious and even permanent damage to vision. Mild, often fleeting, symptoms of solar radiation exposure to the retina include watery eyes, discomfort looking at other bright lights, eye soreness, and headache. Serious, often chronic or permanent, symptoms of prolonged solar radiation exposure to the retina include blurred vision, decreased color perception, difficulty discerning shapes, distorted vision, one or more blind spots in the center of vision, and permanent blindness.

Nevertheless, drivers usually must look directly in their direction of travel in order to maintain vehicle and surrounding safety, and to follow laws concerning the operation of a motor vehicle. Therefore, when travelling during times close to sunset or sunrise, and in the direction the sun is setting or rising, respectively, drivers usually must decide whether to obstruct a large portion of their vision with a sun visor or otherwise obscure the sun's harmful radiation from their retinas. Drivers who experience a daily commute to an employer to their east may face this issue on both their commute into and from work because they drive east in the morning near sunrise and west in the evening near sunset.

To assist drivers in preventing collisions due to sudden solar glares, most vehicles are manufactured equipped with a sun visor or solar visor. Vehicle sun visors usually include the basic features of two hinges and a flap, but may also include a vanity mirror and light, a clip-hinge and swinging hinge to allow rotation of the visor toward the driver or passenger window, and other mechanical or electronic components, as may be desired by drivers. Sun visors have a thickness and span a width and height. The thickness is usually that which is required to house the internal components of a vanity mirror/light, and usually does not exceed approximately 1 inch. Width usually spans from driver-side or passenger-side to approximate vehicle center, and may fluctuate depending on overall vehicle width. Height can vary as well The visor system of passenger and commercial vehicles has well-recognized shortfalls or flaws. These include inability to screen or obstruct sunlight when the sun is especially low in the sky and obstruction of field of vision. Efforts to overcome these shortfalls include mostly-transparent but UV-blocking tinting of a portion or all the windshield, a transparent but UV-blocking tinted visor (replacing the conventional opaque visor), and increased articulation capabilities of the visor (e.g., clipping center hinge and rotating outer hinge). Other means to combat this problem have included tinting a portion or all of a vehicle windshield, wearing sunglasses, and even the simple blocking with a hand or other handheld object or squinting.

Therefore, it is readily apparent that there is a recognized unmet need for an apparatus and method for obstructing a solar glare without causing major obstruction to driver vision. The instant disclosure is designed to address this need through an apparatus and methods of use, which includes apparatus and method disclosed herein while addressing at least some of the aspects of the problems discussed above.

SUMMARY

Briefly described, in a possibly preferred embodiment, the present disclosure overcomes the above-mentioned disadvantages and meets the recognized need for such an automotive safety vehicle interior component by providing an additional means by which drivers may obstruct solar glare while minimizing obstruction of their overall vision. The means may be an apparatus which can attach to a vehicle sun visor, replace an existing vehicle sun visor, or be included in a standard original equipment specification for a vehicle sun visor. At minimum, the improved apparatus may include a flap or tongue which may extend from a vehicle visor. The flap or tongue may be narrower than the overall width of the vehicle visor and may be capable of movement out/down from the visor and in lateral directions along the width of the bottom of the visor. Additionally, the flap may include other features, such as a void within the visor which the flap may reside along with a system which allows it to be concealed/stored and extended/used. In combination, these features may allow a driver to respond to a solar glare event by opening a vehicle sun visor and activating the disclosed apparatus to the location of the solar glare.

More specifically, the example embodiments of the present apparatus may comprise an aftermarket, built-in, Original Equipment Manufacturer (OEM) standard, or even mandated improved apparatus for the obstruction of a solar glare. The apparatus may be included on a driver side sun visor, may be included on a passenger side visor, or both. Though the present apparatus may be manufactured from one or more materials, it the materials used in the solar glare blocking portion of the apparatus should offer the capability of blocking some or all visible light and preferably all ultraviolet radiation. Therefore, the solar glare blocking portion of the apparatus may be opaque, or at least tinted. The level of tinting may be adjustable, based on surrounding photon concentration using photoactive technologies similar to eyeglasses which double as sunglasses outside.

In an exemplary embodiment, the solar glare blocking portion may be tongue-shaped and may have a stopper along one side so as to prevent the full removal of the solar glare blocking portion of the sun visor. In other embodiments, the solar glare blocking portion of the sun visor may be shaped as a rectangle, a triangle, a circle, or another shape which is known to those skilled in the art.

In further embodiments, an internal void may be created within the sun visor. This void may be capable of housing a series of leaf springs arranged laterally along the length of the sun visor, but concealed by the sun visor housing and/or a feature such as a vanity mirror. Within this void may always reside the solar glare blocking portion, which may be wider than an opening from which the remainder of the solar glare blocking portion may protrude. These leaf springs may be further structured and/or arranged to increase friction against the solar glare blocking portion toward the opening and in advance of a full retraction of the solar glare blocking portion.

These and other features of the disclosed sun visor improvement and methods of use will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The disclosed apparatus and methods of use will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in FIGS. 1-7, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples. It should be noted that the term vehicle or automobile may be used herein as a descriptor for any motorized means of transportation. The term sun, as used herein, shall mean the star located at the center of Earth's solar system. The terms glare, shine, light, solar interference, the like, and combinations thereof may be used to refer to any illumination which may interfere with a driver's field of vision. The terms visor and sun visor may be used to describe any interior vehicle feature having an intended use of at least obstructing a solar glare. Additionally, various components of the disclosed visor may be described in various ways. By way of example and not limitation, an opening for the release of internal visor components may be referred to as a slit, a hole, an aperture, a receptacle, or simply an opening and a component designed to fit through the opening may be referred to as a flap, a tongue, a shield, a visor or a sub-visor, or simply extending component.

Referring now to FIGS. 1-4 by way of example, and not limitation, therein are illustrated several perspective driver views of the interior portion of vehicle A having thereon installed the disclosed visor V improvement.

Figure 1:
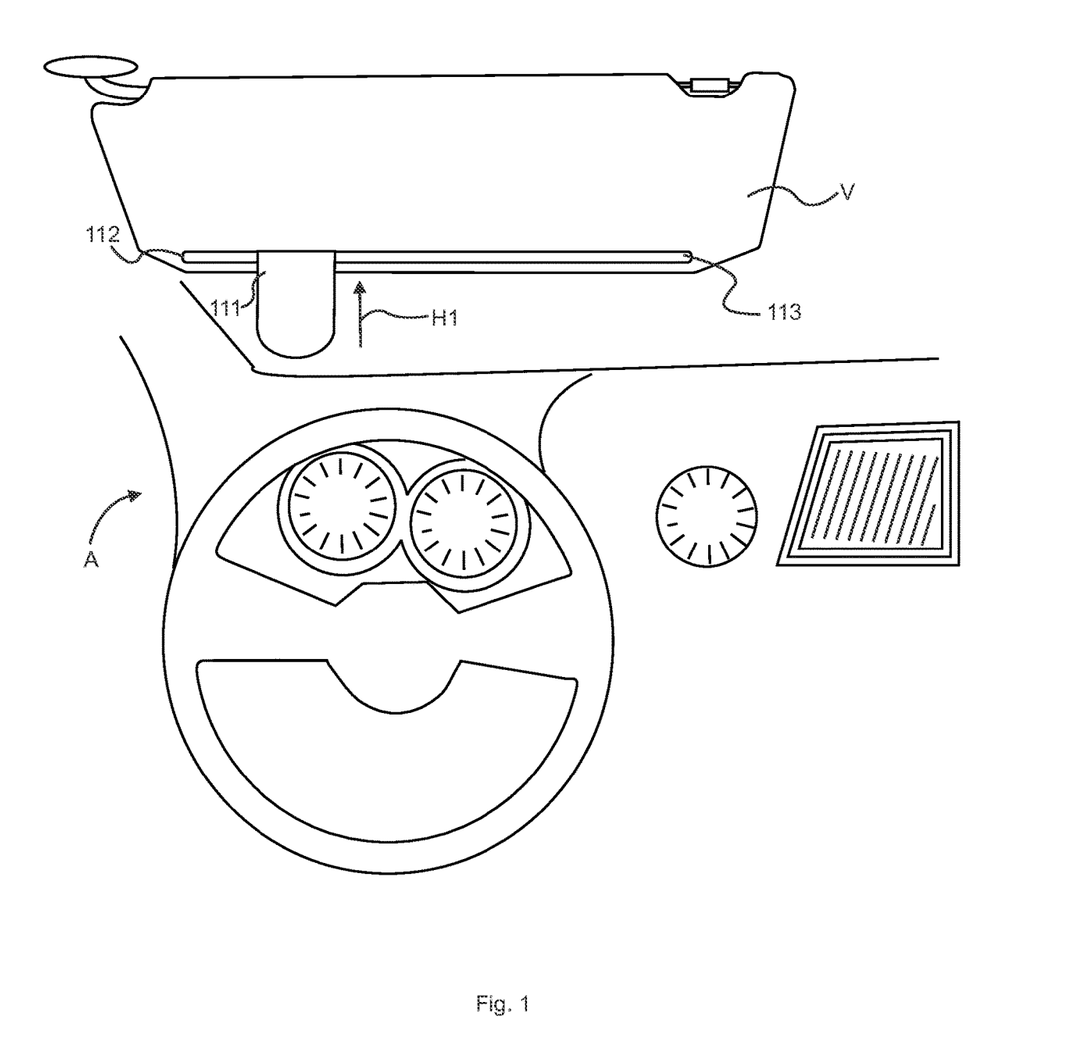
FIG. 1 is a perspective driver view of a vehicle interior featuring one embodiment of the disclosed apparatus in a first position.

Referring specifically to FIG. 1, therein is illustrated a perspective driver view of the interior portion of vehicle A having thereon installed the disclosed visor V improvement, the improvement in a first position. Standard features of commonly equipped visor V and vehicle A are illustrated, but have limited relevance to the improved visor V. These include a steering wheel, instrument cluster, console, dashboard, and A pillar of vehicle A and the hinges of visor V. Relevant improvements to visor V include a slit having first end 112 and second end 113 and tongue 111. As will be appreciated by those having skill in the art after a review of the remaining drawings, tongue 111 can be moved in direction H1 in order to conceal it during non-use. Additionally, the structure of tongue 111 and other improvements to visor V allow articulation of tongue 111 to a lateral position along a driver's view of a horizon. In use, a driver seated in vehicle A may fold down visor V about the hinges of visor V during a moment of sudden solar glare. Should the need to fold down visor V cause the driver to obstruct too much of their vision, the driver may decide to extend tongue 111 opposite direction H1. When the solar glare has moved in relation to the driver's view, the driver may wish to adjust tongue 111 along the slit in the direction of either first end 112 or second end 113. If instead, the solar glare resides completely, the driver may wish to conceal hide, conceal or otherwise store tongue 111 within visor V, which may then be stored itself above the driver on the vehicle interior roof/ceiling. The overall structure and inclusion of the improvements to visor V may afford a driver these capabilities and others in order to minimize the solar glare and maximize a driver's field of view by only obstructing a narrow portion along a horizontal slit or track.

Figure 2:
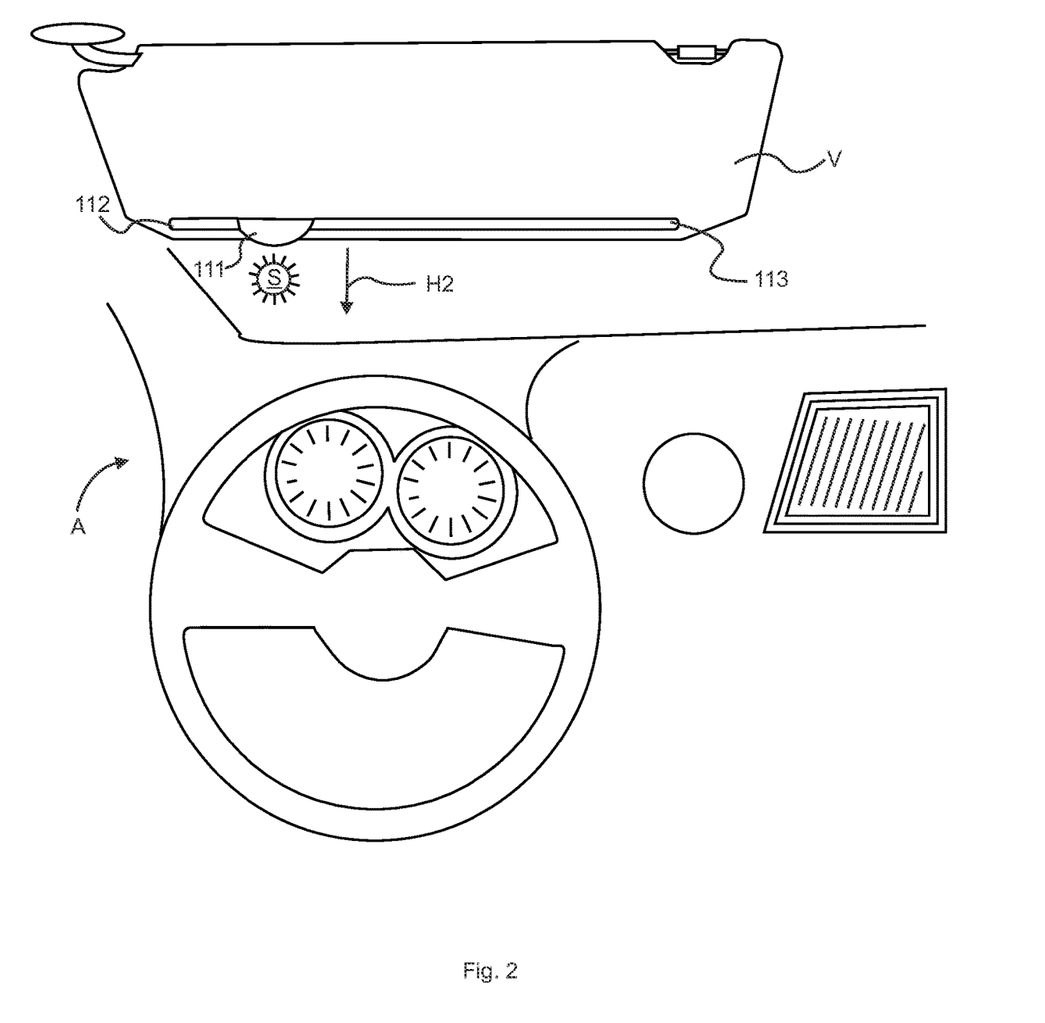
FIG. 2 is a perspective driver view of a vehicle interior featuring the same embodiment of the disclosed apparatus in a second position.

Referring specifically to FIG. 2, therein is illustrated a perspective driver view of the interior portion of vehicle A having thereon installed the disclosed visor V improvement, the improvement in a second position. Standard features of commonly equipped visor V and vehicle A are illustrated as in FIG. 1, but have limited relevance to the improved visor V. These include a steering wheel, an instrument cluster, a console, a dashboard, and an A pillar of vehicle A and the hinges of visor V. Relevant improvements to visor V include a slit having first end 112 and second end 113 and tongue 111. As illustrated, sun S is now visible to a driver seated in vehicle A. This is due to tongue 111 having moved in direction H1, as previously illustrated in FIG. 1. FIG. 2 may be described as an illustration, therefore, of the sudden glare event at its inception. By moving tongue 111 in direction 112, one skilled in the art would appreciate that sun S may be limited in its effect on the driver while also not obstructing the driver view in the direction of first end 112 and second end 113. Since tongue 111 is concealed, a driver wishing to use the disclosed visor V improvement, the driver would first have folded down V about the hinges of visor V during a moment of sudden solar glare. Should the need to fold down visor V cause the driver to obstruct too much of their vision, the driver may decide to extend tongue 111 in direction 112 to cover sun S. When sun S has moved in relation to the driver's view, the driver may wish to hide, conceal or otherwise store tongue 111 within visor V, which may then be stored itself above the driver on the vehicle interior roof/ceiling.

Figure 3:
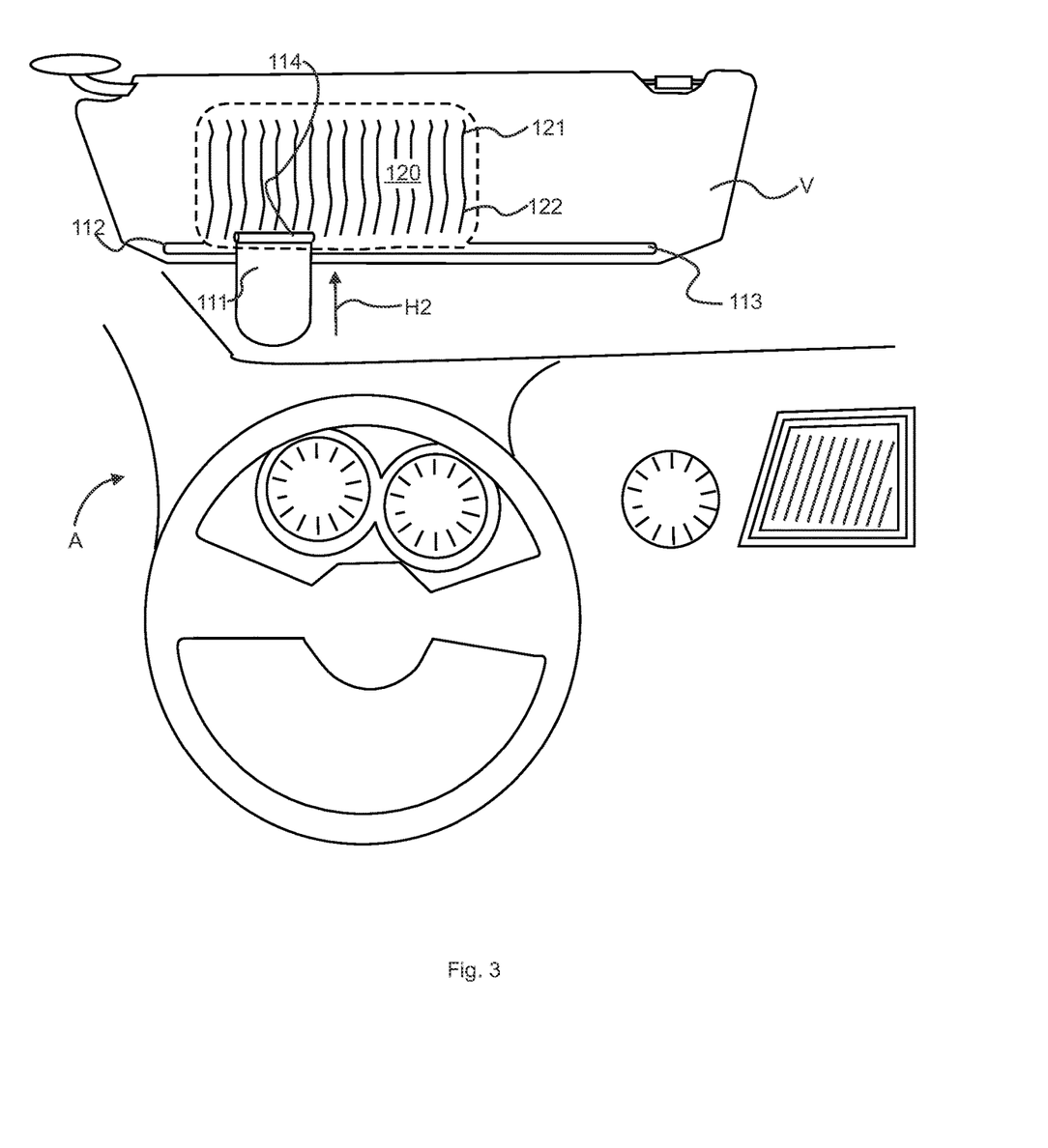
FIG. 3 is a perspective driver view of a vehicle interior, the vehicle sun visor having a cutaway to expose features the same embodiment of the disclosed apparatus in the first position.

Referring specifically to FIG. 3, therein is illustrated a perspective driver view of the interior portion of vehicle A having thereon installed the disclosed visor V improvement, visor V is illustrated having a front cutaway portion, the improvement in a first position. Standard features of commonly equipped visor V and vehicle A are illustrated as in FIGS. 1-2, but have limited relevance to the improved visor V. These include a steering wheel, instrument cluster, console, dashboard, and A pillar of vehicle A and the hinges of visor V. Relevant improvements to visor V include a slit having first end 112 and a second end 113 and tongue 111. As will be appreciated by those having skill in the art after a review of the remaining drawings, tongue 111 can be moved in direction H1 in order to conceal it during non-use. Additionally, the structure of tongue 111 and other improvements to visor V allow articulation of tongue 111 to a lateral position along a driver's view of a horizon. In use, a driver seated in vehicle A may fold down visor V about the hinges of visor V during a moment of sudden solar glare. Having illustrated visor V having a cutaway of a front portion of visor V to expose internal components, additional features of the disclosed improvement to visor V may be better appreciated by those skilled in the art. There behind front portion of visor V may be series of leaf springs 120, said series of leaf springs 120 having upper area 121 and lower area 122. Series of leaf springs 120 may be aligned vertically. Series of leaf springs 120 may consist of a series of relatively or very thin, flat strips of metal or other suitable material. Each of series of leaf springs 120 may have an overall narrow, long, and flat shape, so as to install series of leaf springs 120 laterally across an internal void within visor V in the direction of first end 112 and second end 113. Further appreciation of series of leaf springs 120 and their shape when viewed from other angles may be obtained by those skilled in the art after a review of FIGS. 5*a*, 5*b*, and 6. Additional features exposed by the illustrated cutaway of front of visor V may include tongue stopper 114. Tongue 111 may be sized and shaped to allow free movement of its outer portion through the slit anywhere between first end 112 and second end 113, with tongue stopper 114 preventing full ejection of tongue 111. Should the need to fold down visor V cause the driver to obstruct too much of their vision, the driver may decide to extend tongue 111 opposite direction H1, and may only do so to the point which tongue stopper 114 prevents ejection of tongue 111. When the solar glare has moved in relation to the driver's view, the driver may wish to adjust tongue 111 along the slit in the direction of either first end 112 or second end 113. If instead, the solar glare resides completely, the driver may wish to conceal hide, conceal or otherwise store tongue 111 within visor V, which may then be stored itself above the driver on the vehicle interior roof/ceiling. The overall structure and inclusion of the improvements to visor V may afford a driver these capabilities and others in order to minimize the solar glare and maximize a driver's field of view by only obstructing a narrow portion along a horizontal slit or track.

Figure 4:
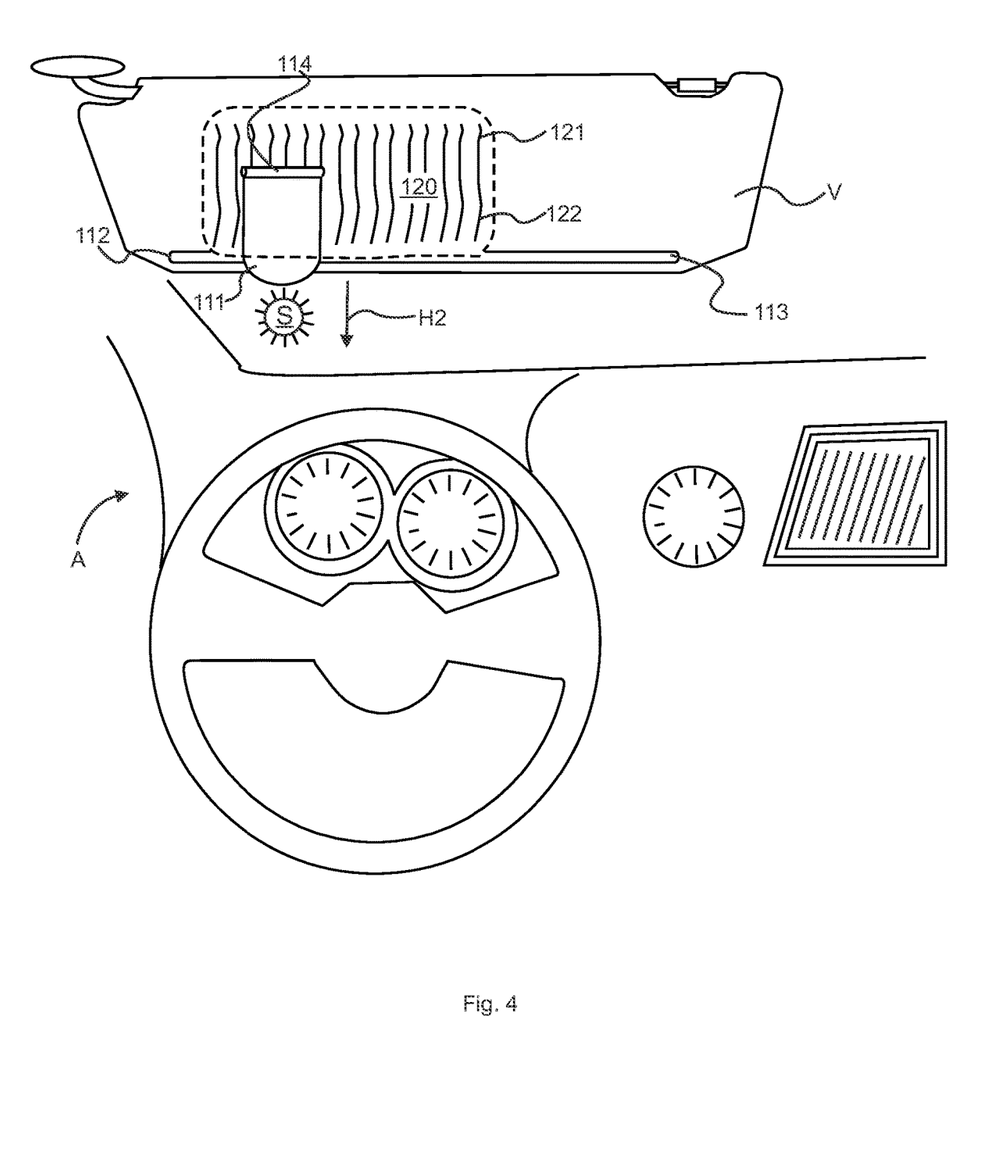
FIG. 4 is a perspective driver view of a vehicle interior, the vehicle sun visor having a cutaway to expose features the same embodiment of the disclosed apparatus in the second position.

Referring specifically to FIG. 4, therein is illustrated a perspective driver view of the interior portion of vehicle A having thereon installed the disclosed visor V improvement, visor V is illustrated having a front cutaway portion, the improvement in a second position. Standard features of commonly equipped visor V and vehicle A are illustrated as in FIGS. 1-3, but have limited relevance to the improved visor V. These include a steering wheel, instrument cluster, console, dashboard, and A pillar of vehicle A and the hinges of visor V. Relevant improvements to visor V include a slit having first end 112 and a second end 113 and tongue 111. As illustrated, sun S is now visible to a driver seated in vehicle A. This is due to tongue 111 having moved in direction H1, as previously illustrated in FIGS. 1 and 3. FIG. 4 may be described as an illustration, therefore, of the sudden glare event at its inception. By moving tongue 111 in direction 112, one skilled in the art would appreciate that sun S may be limited in its effect on the driver while also not obstructing the driver view in the direction of first end 112 and second end 113. Having illustrated visor V having a cutaway of a front portion of visor V to expose internal components, additional features of the disclosed improvement to visor V may be better appreciated by those skilled in the art. There behind front portion of visor V may be series of leaf springs 120, said series of leaf springs 120 having upper area 121 and lower area 122. Series of leaf springs 120 may be aligned vertically. Series of leaf springs 120 may consist of a series of relatively or very thin, flat strips of flexible metal or other sturdy but flexible suitable material. Each of series of leaf springs 120 may have an overall narrow, long, and flat shape, so as to install series of leaf springs 120 laterally across an internal void within visor V in the direction of first end 112 and second end 113. Further appreciation of series of leaf springs 120 and their shape when viewed from other angles may be obtained by those skilled in the art after a review of FIGS. 5a, 5b, and 6. Additional features exposed by the illustrated cutaway of front of visor V may include tongue stopper 114. Tongue 111 may be sized and shaped to allow free movement of its outer portion through the slit anywhere between first end 112 and second end 113, with tongue stopper 114 preventing full ejection of tongue 111. Should the need to fold down visor V cause the driver to obstruct too much of their vision, the driver may decide to extend tongue 111 opposite direction H1, and may only do so to the point which tongue stopper 114 prevents ejection of tongue 111. Since tongue 111 is concealed, a driver wishing to use the disclosed visor V improvement, the driver would first have folded down V about the hinges of visor V during a moment of sudden solar glare. Should the need to fold down visor V cause the driver to obstruct too much of their vision, the driver may decide to extend tongue 111 in direction 112 to cover sun S. When sun S has moved in relation to the driver's view, the driver may wish to hide, conceal or otherwise store tongue 111 within visor V, which may then be stored itself above the driver on the vehicle interior roof/ceiling.

Figures 5A, 5B:
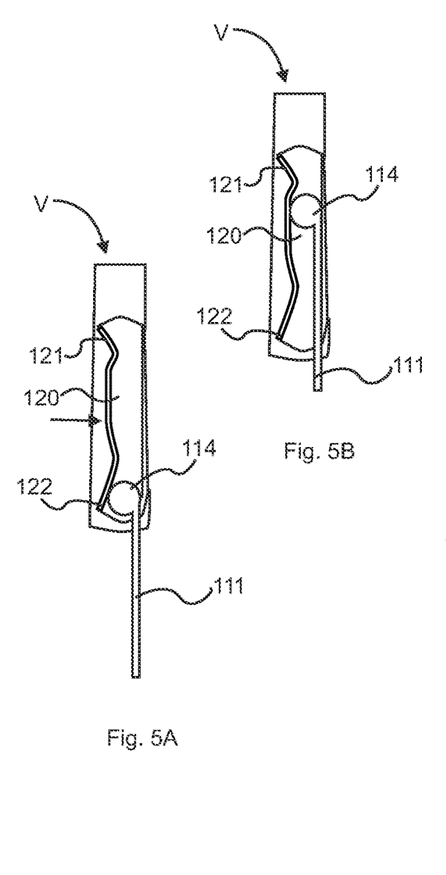
FIG. 5a is a cross-sectional elevational side cutaway view of an embodiment of the disclosed apparatus in the first position.
FIG. 5b is a cross-sectional elevational side view of an embodiment of the disclosed apparatus in the second position.

Referring now to FIG. 5a, therein illustrated is a cross-sectional elevational side cutaway view of an embodiment of the disclosed visor V improvement in the first position (tongue 111 extended). Within a void of visor V may be installed series of leaf springs 120 having upper area 121 and lower area 122. Series of leaf springs 120 may consist of a series of relatively or very thin, flat strips of metal or other suitable material. In this position, tongue stopper 114 may rest at lower area 122 of series of leaf springs 120. Viewing series of leaf springs 120 from this angle, one of skill in the art may appreciate the usefulness of series of leaf springs 120 in the placement management of tongue 111 and tongue stopper 114 within the void of visor V. As illustrated, series of leaf springs 120 may be bent or shaped to allow widening and narrowing along the height of visor V. Toward the top of visor V and series of leaf springs 120, may be a widening of the void still present in which tongue 111 may reside. Then the same void may narrow slightly to a sharp edge of series of leaf springs 120 proximate where tongue stopper 114 may rest when visor V is in its second position. The sharp edge illustrated therein may physically stop tongue stopper 114, preventing tongue 111 from being lost within the void. The same void may widen then thanks to the shape of series of leaf springs 120 to a less drastic or smoother edge, which tongue stopper 114 is capable of traversing, given sufficient applied force. Then, series of leaf springs 120 may cause the same void to widen once again to create a pinch point for tongue stopper 114 to reside when visor V is in the first position. If a driver has extended tongue 111 of visor V, he or she may retract tongue 111 by pressing it from the second position to the first position. As tongue stopper 114 traverses from lower area 122 to upper area 121 of the void, it may make contact along the way and due to the size, shape, and arrangement illustrated herein of series of leaf springs 120, friction therebetween tongue stopper 114 and series of leaf springs 120 may secure it from the first position to the second position when sufficient force is placed upon tongue 111. Due to the upper sharp edge of series of leaf springs 120 proximate upper area 121, a driver may not push tongue 111 past a certain point, which may allow the driver to retrieve tongue 111 when needed later.

Referring now to FIG. 5b, therein illustrated is a cross-sectional elevational side view of an embodiment of the disclosed visor V improvement in the second position (tongue 111 retracted). Within a void of visor V may be installed series of leaf springs 120 having upper area 121 and lower area 122. Series of leaf springs 120 may consist of a series of relatively or very thin, flat strips of metal or other suitable material. In this position, tongue stopper 114 may rest at lower area 122 of series of leaf springs 120. Viewing series of leaf springs 120 from this angle, one of skill in the art may appreciate the usefulness of series of leaf springs 120 in the placement management of tongue 111 and tongue stopper 114 within the void of visor V. As illustrated, series of leaf springs 120 may be bent or shaped to allow widening and narrowing along the height of visor V. Toward the top of visor V and series of leaf springs 120, may be a widening of the void still present in which tongue 111 may reside. Then the same void may narrow slightly to a sharp edge of series of leaf springs 120 proximate where tongue stopper 114 may rest when visor V is in its second position. The sharp edge illustrated therein may physically stop tongue stopper 114, preventing tongue 111 from being lost within the void. The same void may widen then thanks to the shape of series of leaf springs 120 to a less drastic or smoother edge, which tongue stopper 114 is capable of traversing, given sufficient applied force. Then, series of leaf springs 120 may cause the same void to widen once again to create a pinch point for tongue stopper 114 to reside when visor V is in the first position. If a driver has extended tongue 111 of visor V, he or she may retract tongue 111 by pressing it from the second position to the first position. As tongue stopper 114 traverses from lower area 122 to upper area 121 of the void, it may make contact along the way and due to the size, shape, and arrangement illustrated herein of series of leaf springs 120, friction therebetween tongue stopper 114 and series of leaf springs 120 may secure it from the first position to the second position when sufficient force is placed upon tongue 111. Due to the upper sharp edge of series of leaf springs 120 proximate upper area 121, a driver may not push tongue 111 past a certain point, which may allow the driver to retrieve tongue 111 when needed later. By comparing FIGS. 5a and 5b, one skilled in the art may appreciate the design as a thin and simple mechanism to release a sub-visor, or tongue 111, to allow lifting of visor V to minimize the visual obstruction of visor V while maintaining obstruction of sun S.

Figure 6:
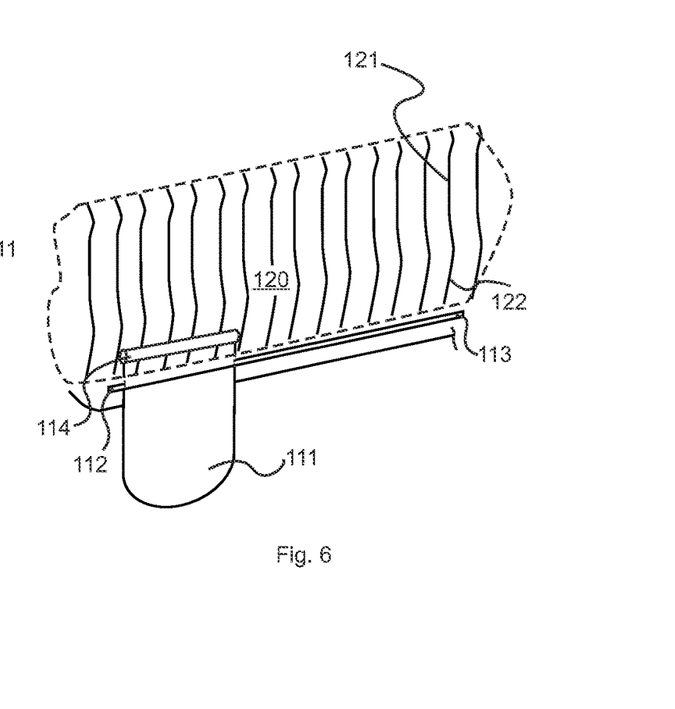
FIG. 6 is a closeup cutaway perspective view of the internal structure of an embodiment of the disclosed apparatus.

Referring now to FIG. 6, therein illustrated is a closeup cutaway perspective view of the internal structure of an embodiment of the disclosed visor V improvement. Relevant improvements to visor V that can be more readily visible in this closeup cutaway illustration include the slit having first end 112 and second end 113, tongue 111 having tongue stopper 114, and series of leaf springs 120 having upper area 121 and lower area 122. The overall shape and overall construction of the disclosed improved visor V may be further observed. Series of leaf springs 120 may be aligned generally vertically and may be bent to achieve the intended features disclosed above. Series of leaf springs 120 may consist of a series of relatively or very thin, flat strips of metal or other suitable material. Each of series of leaf springs 120 may have an overall narrow, long, and flat shape, so as to install series of leaf springs 120 laterally across an internal void within visor V in the direction of first end 112 and second end 113. Tongue 111 may be sized and shaped to allow free movement of its outer portion through the slit anywhere between first end 112 and second end 113, with tongue stopper 114 preventing full ejection of tongue 111. Should the need to fold down visor V cause the driver to obstruct too much of their vision, the driver may decide to extend tongue 111 opposite direction H1, and may only do so to the point which tongue stopper 114 prevents ejection of tongue 111. When the solar glare has moved in relation to the driver's view, the driver may wish to adjust tongue 111 along the slit in the direction of either first end 112 or second end 113. If instead, the solar glare resides completely, the driver may wish to conceal hide, conceal or otherwise store tongue 111 within visor V, which may then be stored itself above the driver on the vehicle interior roof/ceiling.

Figure 7:
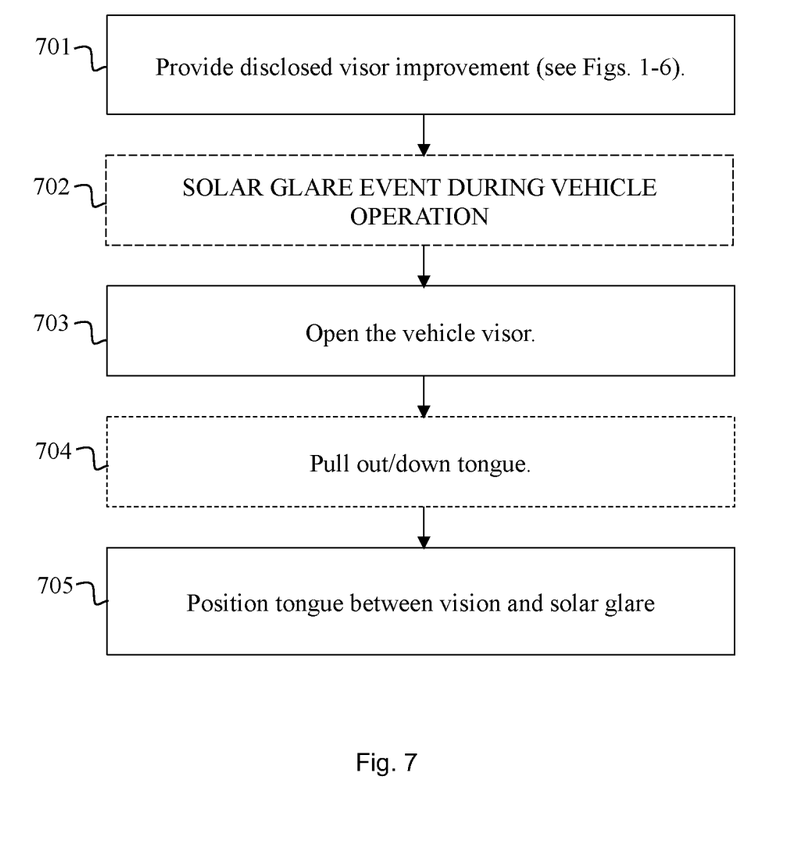
FIG. 7 is a flowchart of the disclosed method of use of the apparatus.

Referring now to FIG. 7, therein illustrated is a flowchart of the disclosed method of use of the apparatus. At first method step 701, vehicle sun visor V is provided having the above-detailed improvements. At second method step 702, a solar glare event occurs. At third method step 703, a driver may choose to open their sun visor V, only to find a major portion of their vision obscured. At fourth method step 704, a driver may pull out and/or down tongue 111, then at fifth method step 705, reposition tongue 111 so as to interfere with a smaller field of view, namely, where sun S appears in the driver field of view. Optional steps may include further repositioning subsequent a period of time and/or a turn and following these steps in reverse so as to conceal/store tongue 111 and sun visor V.

The illustrations and diagrams (hereafter "illustrations") described herein are intended to provide a general understanding of the structure of various embodiments of the disclosed device. The illustrations are not intended to serve as a complete description of all of the elements and features of the apparatus, product, method of use, and/or system that utilizes the structures and/or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

As contemplated herein, tongue 111 of the disclosed device may be manufactured in various shapes and sizes, including but not limited to shapes such as tongue-shaped, rectangles, circles, spheres, cylinders, triangular prisms, rectangular prisms, cubes, cones/funnels, the like and/or combinations thereof and all sizes by which may be used to interfere with the light cast by sun S (or any bright light source) into vehicle V (or any area where may be appropriate). Various other parts of the device may also be embodied in various shapes and sizes and the disclosure is not so limited to those embodied in the illustrations. To this end, by way of example and not limitation, slits and/or tracks may be long or short and wide or narrow and straight, curved, or jagged, a void within a sun visor may encompass a wide or narrow portion of the sun visor, slit or tracks may extend along a portion or all of the width of a sun visor, they may be detached and only connected during use, as well as modifications of the like and/or combinations thereof. While specific materials may be contemplated herein for the construction of the device, the disclosure is not so limited. One skilled in the art may know of many suitable materials for the purposes described herein and suitable materials not known at the time of the invention may be developed. These include but are not limited to plastics, rubbers, liquid crystal matrices, metals, wood, composite materials, fiberglass, carbon fiber, other synthetic materials, other natural materials, the like and/or combinations thereof. Tongue 111 may be opaque, transparent, semi-transparent, tinted, have photoactive tinting properties, have electronically controlled transparency controls (e.g., liquid crystal matrix with polarization), the like and/or combinations thereof. Tongue 111 may be manufactured in a variety of colors, including but not limited to: black, white, red, orange, yellow, blue, indigo, purple, the like and/or combinations thereof. Various color choices may have corresponding utilitarian purposes including but not limited to increasing ability to absorb and/or reflect light and/or aesthetic benefits. While a size is disclosed relative to the sun visor of a vehicle, tongue 111 is not limited to any size. Finally, it is herein contemplated that the device of the disclosure could replace an existing sun visor V, sun visor V could be modified to include the device of the disclosure, and/or a device could be manufactured and be accommodated alongside existing sun visors V (i.e., be bolted or otherwise attached onto an existing sun visor V).

In use, the device may be best used when a sun visor is flipped down. During non-use, tongue 111 may retract into a void or other hollow compartment within the sun visor. In use, having flipped down sun visor V, the driver may extend tongue 111 downward through a pulling action. The driver then may arrange tongue 111 and sun visor V so as to provide optimal sun-blocking and visibility. When not driving toward a bright light, tongue 111 may be again retracted and sun visor V may be stored as normally done in existing vehicles A. As contemplated herein, multiple improvements to disclosed sun visor V may be readily apparent to those skilled in the art. By way of example and not limitation, the movement, articulation, activation, or use of the sun patch could also be achieved by other mechanical such as: a series moveable levers and/or flaps extending from fixed locations along the bottom of visor V (instead of or in addition to a series of leaf springs), a series and/or group of scissor levers having cogged wheels, a miniature motor-driven mechanism, a magnetic or electro-magnetic powered system of flaps, a pneumatic system or elastic material having spring-like qualities to keep tongue 111 positioned at a desired position/point but which may be easily moveable with appropriate manual force, the like and/or combinations thereof. Additionally, the movement of retracting, receding, and action of lateral movement (i.e., left and right) may also be achieved using electronic systems which may include various features such as a toggle switch on the steering wheel, seat, driver door, console, or other area which may be easily accessible to a driver. Any system having the disclosed sun visor V improvements as herein described may be capable of increasing the utility of sun visor V in the intended way and are intended to be described herein.

The foregoing description and drawings comprise illustrative embodiments of the present disclosure. Having thus described exemplary embodiments, it should be noted by those ordinarily skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

What is claimed is:

1. A vehicle sun visor comprising:
    a visor housing having a void among a hinge end, a handle end, a window end, a console end, a window side, and a ceiling side, said visor housing further comprising a lateral opening having a first thickness, said opening proximate said handle end along said ceiling side; and
    a retractable tongue having a second thickness which is smaller than said first thickness and a stopper having a third thickness which is larger than said first thickness;
    wherein said retractable tongue may be extended from said vehicle sun visor and positioned along said opening to block a sun glare at a position more specific than said vehicle sun visor is capable.

2. The vehicle sun visor of claim 1, wherein said retractable tongue is opaque.

3. The vehicle sun visor of claim 1, wherein said retractable tongue is transparent and tinted.

4. The vehicle sun visor of claim 1, wherein said void houses a series of leaf springs.

5. The vehicle sun visor of claim 4, wherein said series of leaf springs comprise a flexible metal.

6. The vehicle sun visor of claim 5, wherein said series of leaf springs are bent to increase friction therebetween said retractable tongue and said series of leaf springs during an ejection or a retraction.

7. The vehicle sun visor of claim 6, wherein said series of leaf springs are further bent to prevent a full retraction of said retractable tongue.

8. The vehicle sun visor of claim 4, wherein said series of leaf springs has a tension against said retractable tongue.

9. The vehicle sun visor of claim 1, wherein said retractable tongue further comprises a width and a length, said width is smaller than an overall width of the vehicle sun visor, and the length is smaller than a height of the vehicle sun visor.

10. The vehicle sun visor of claim 3, wherein said retractable tongue is tinted with photoactive molecules, thereby increasing a level of tint according to a level of light.

11. The vehicle sun visor of claim 4, wherein said series of leaf springs within said void create a non-uniform thickness within said void.

12. A method of increasing a driver visibility during a solar glare event:
    installing a vehicle sun visor in a vehicle of said driver, said vehicle sun visor comprising:
        a visor housing having a void among a hinge end, a handle end, a window end, a console end, a window side, and a ceiling side, said visor housing further comprising a lateral opening having a first thickness, said opening proximate said handle end along said ceiling side; and
        a retractable tongue having a second thickness which is smaller than said first thickness and a stopper having a third thickness which is larger than said first thickness;
    opening said vehicle visor;
    pulling upon said retractable tongue, thereby extending the retractable tongue;
    positioning said retractable tongue along said lateral opening therebetween said solar glare and an at least one eye of the driver.

13. The method of claim 12, further comprising a step of re-positioning said retractable tongue along said lateral opening therebetween said solar glare and the at least one eye of the driver in response to a change in vehicle direction.

14. The method of claim 12, further comprising a step of closing the vehicle sun visor to a distance which the solar glare is minimized and the driver visibility is maximized.

15. The method of claim 12, wherein said retractable tongue is opaque.

16. The method of claim 12, wherein said retractable tongue is transparent.

17. The method of claim 12, wherein said void houses a series of leaf springs.

18. The method of claim 17, wherein said series of leaf springs comprise a flexible metal.

19. The method of claim 17, wherein said series of leaf springs are bent to increase friction therebetween said retractable tongue and said series of leaf springs during an ejection or a retraction.

20. The method of claim 19, wherein said series of leaf springs are further bent to prevent a full retraction of said retractable tongue.

* * * * *